Figure 1:
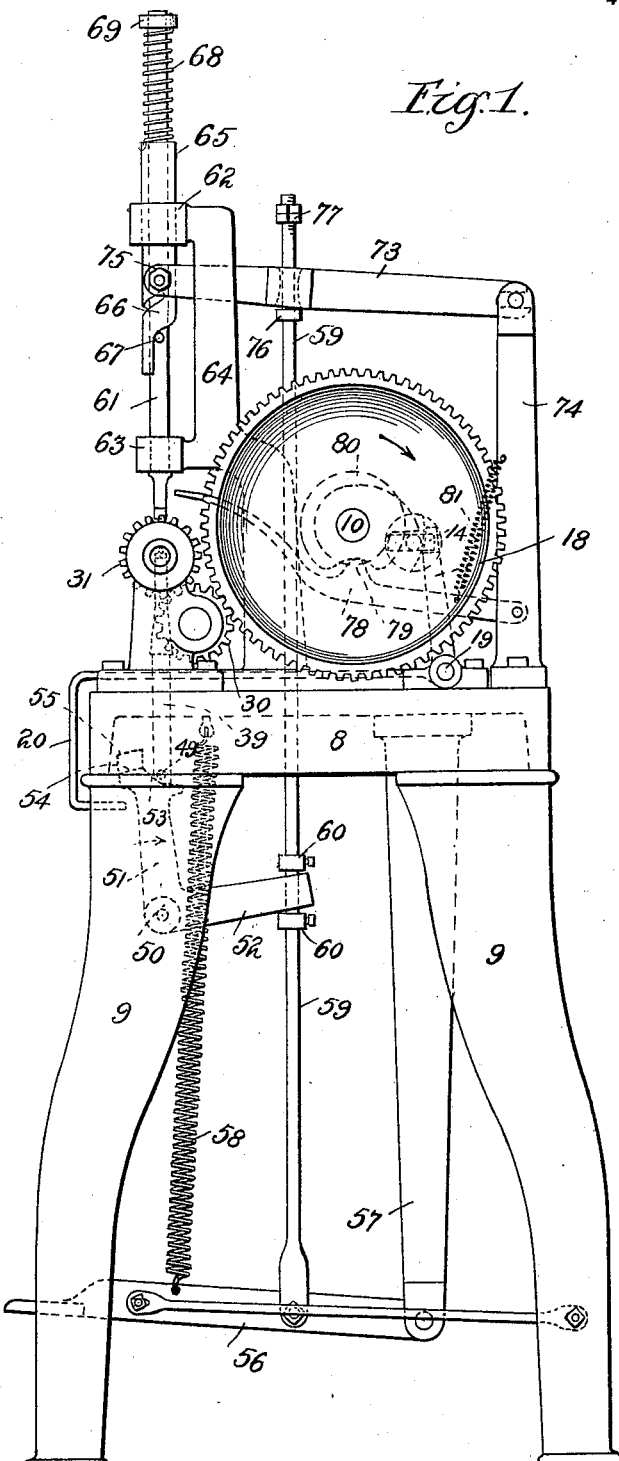

No. 607,372. Patented July 12, 1898.
F. W. & A. G. HOEFER.
MACHINE FOR FORMING INTERLOCKING EYES.
(Application filed Nov. 4, 1897.)
(No Model.) 4 Sheets—Sheet 1.

No. 607,372. Patented July 12, 1898.
F. W. & A. G. HOEFER.
MACHINE FOR FORMING INTERLOCKING EYES.
(Application filed Nov. 4, 1897.)
(No Model.) 4 Sheets—Sheet 2.
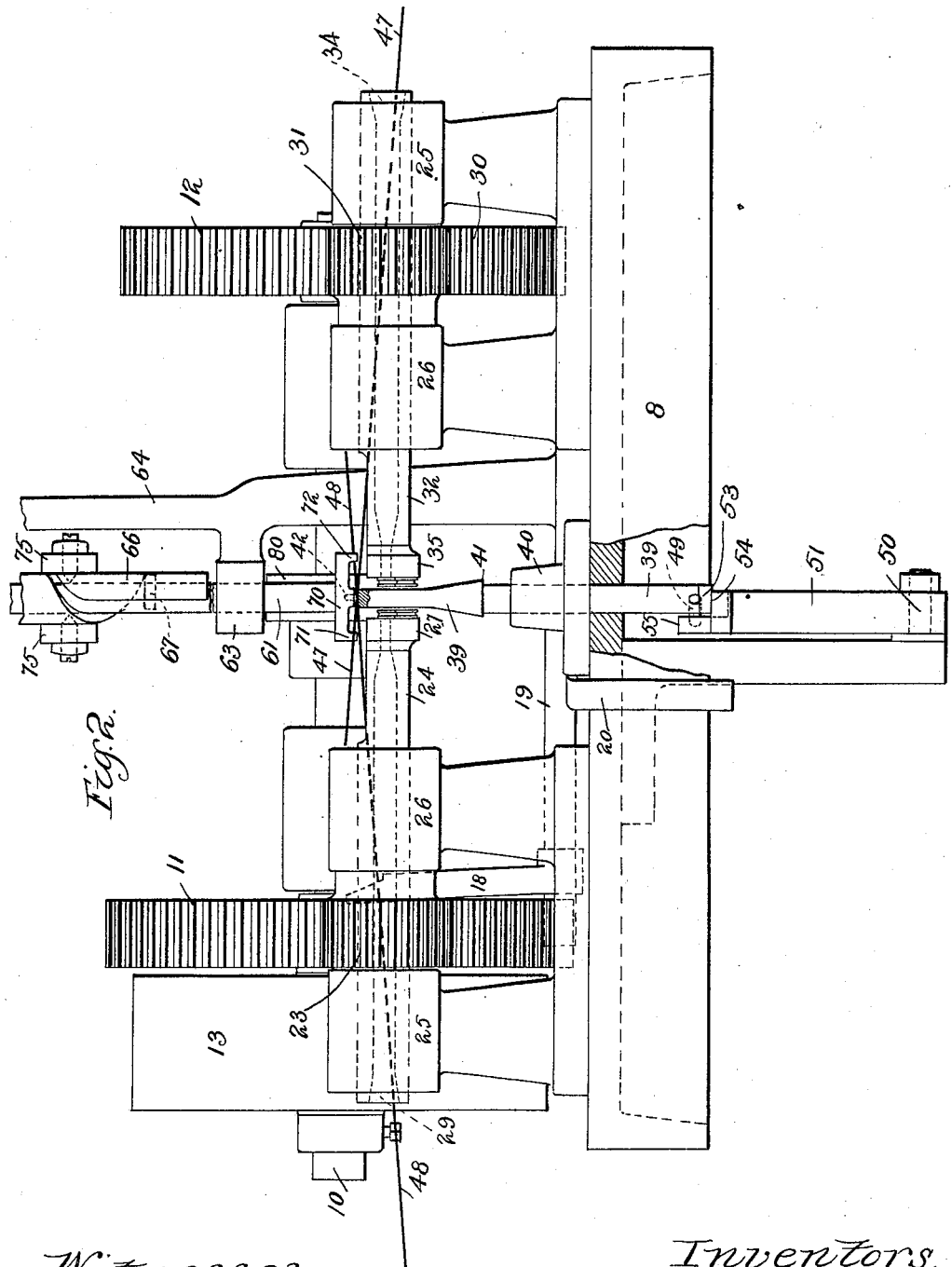

No. 607,372. Patented July 12, 1898.
F. W. & A. G. HOEFER.
MACHINE FOR FORMING INTERLOCKING EYES.
(Application filed Nov. 4, 1897.)
(No Model.) 4 Sheets—Sheet 3.
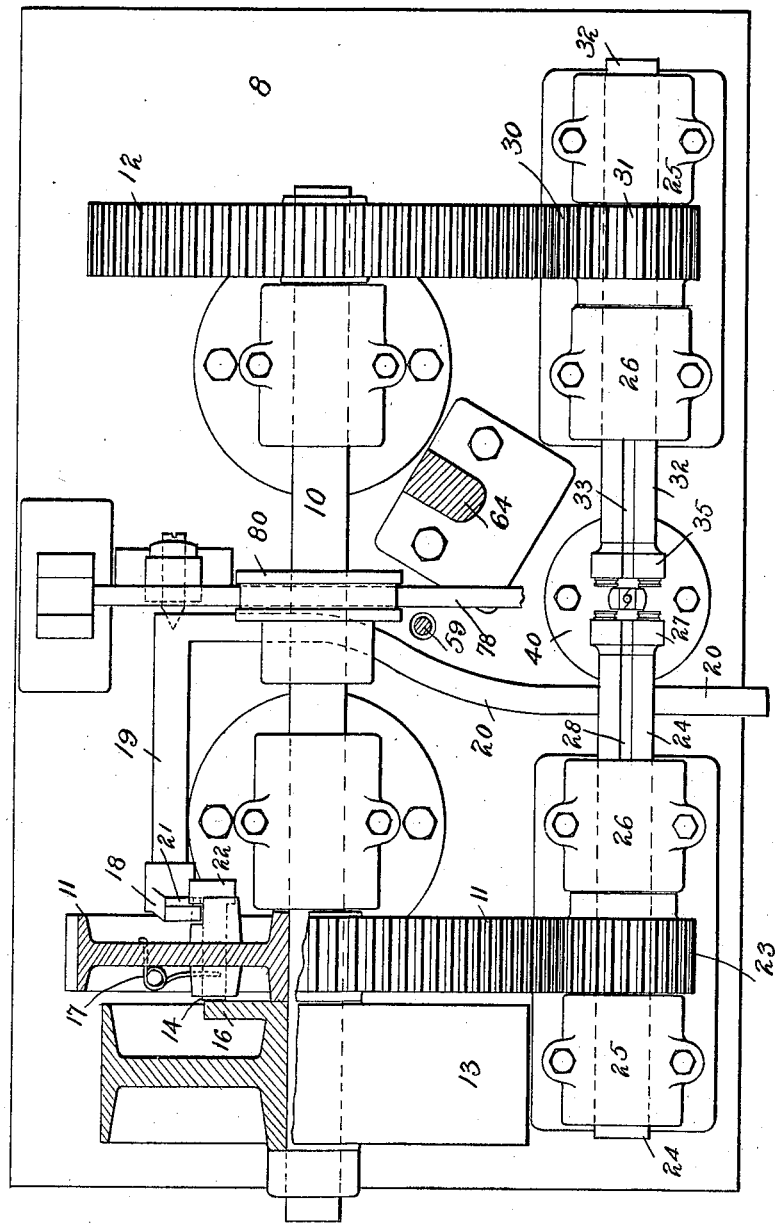
Witnesses
Wm M. Rheem.
Holmes A. Bilden.
Inventors.
Frederick W. Hoefer,
August G. Hoefer,
by Bond, Adams, Pickard & Jackson.
Atty's.

No. 607,372. Patented July 12, 1898.
F. W. & A. G. HOEFER.
MACHINE FOR FORMING INTERLOCKING EYES.
(Application filed Nov. 4, 1897.)
(No Model.) 4 Sheets—Sheet 4.
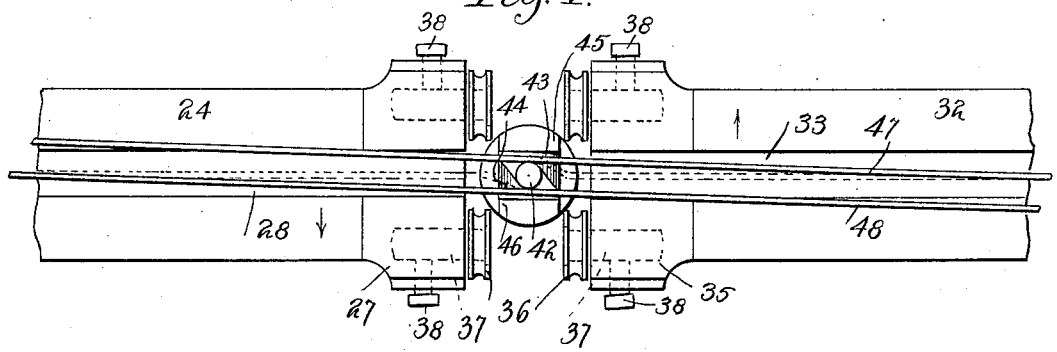
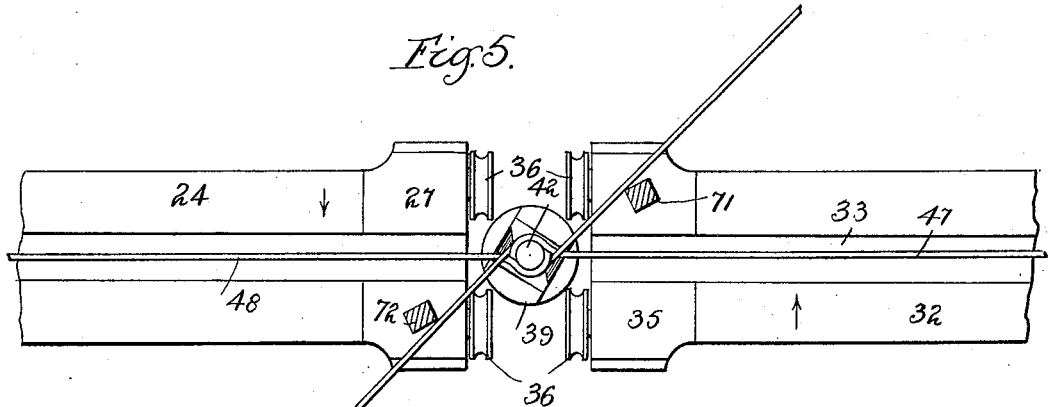
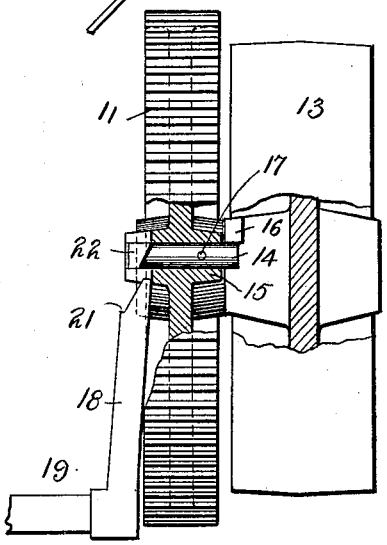
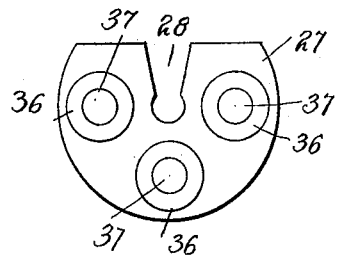
Witnesses.
Wm. M. Rheem.
Holmes A. Tilden.
Inventor,
Frederick W. Hoefer,
August G. Hoefer,
by Bond Adams Pickard Jackson.
Att'ys
THE NORRIS PETERS CO., PHOTO-LITHO., WASHINGTON, D. C.

UNITED STATES PATENT OFFICE.

FREDERICK W. HOEFER AND AUGUST G. HOEFER, OF FREEPORT, ILLINOIS, ASSIGNORS TO THE STOVER NOVELTY WORKS, OF SAME PLACE.

MACHINE FOR FORMING INTERLOCKING EYES.

SPECIFICATION forming part of Letters Patent No. 607,372, dated July 12, 1898.

Application filed November 4, 1897. Serial No. 657,364. (No model.)

*To all whom it may concern:*

Be it known that we, FREDERICK W. HOEFER and AUGUST G. HOEFER, citizens of the United States, residing in Freeport, in the county of Stephenson, State of Illinois, have invented certain new and useful Improvements in Machines for Forming Interlocking Eyes, of which the following is a specification.

Our invention relates to machines for forming interlocking eyes, particularly in wire used for check-row corn-planters, although it is not limited to making interlocking eyes in wire for such use alone.

It has for its objects to provide certain improvements in machines of this character, such improvements relating to mechanism for forming the interlocking loops, to the mechanism for twisting the free ends of the wire to complete the eyes, to the starting and stopping mechanism, and to various other features of construction, all of which will be hereinafter specifically pointed out.

In the drawings, Figure 1 is an end elevation of our improved machine. Fig. 2 is a partial front view, some parts being in section. Fig. 3 is a plan view, some of the parts being in section. Fig. 4 is a plan view of the twister-heads and the spindle around which the wires are looped. Fig. 5 is a somewhat similar view showing the position of the wires after the loop has been formed, but before the ends of the wire have been secured. Fig. 6 is a view of the clutch mechanism. Fig. 7 is an end view of one of the twister-heads.

The general plan of our machine is as follows: There are two twister-heads, arranged opposite each other, carried by shafts whose axes are in the same line, such shafts being arranged to be rotated equally in opposite directions by suitable driving-gears driven from a common source of power. The two twister-head shafts are arranged in a horizontal position and have longitudinal passages through which the wires pass, slots being provided in said shafts at their inner ends leading from said passages, so that the inner ends of the wires may be carried out of the shafts free from the twister-heads and may cross each other in inclined positions, as illustrated in Fig. 2. Between the opposite twister-heads is a lower spindle, carrying a pin at its upper end, around which the loop is formed, such pin being normally substantially in line with the centers of the twister-heads and the passages in the twister-head shafts. An upper spindle is arranged in line with the lower spindle and carries at its lower end a fork which is adapted to engage the free ends of the wires and twist them about the pin above mentioned, forming the loop. Before forming the loop the lower spindle is elevated so that its pin lies above the plane of the twister-head, and by a partial rotation of the lower spindle the ends of the wire are bent slightly to start the loop properly. The upper spindle is then moved down into engagement with the free ends of the wires and is caused to rotate by suitable mechanism, forming interlocking loops, after which the upper spindle is moved up out of the way and the lower spindle moved down until its pin lies in line with the centers of the twister-heads. The twister-heads are then caused to rotate and by such rotation engage the free ends of the looped wires, wrapping them around the body of the wires, completing the loops or eyes. The various movements of the spindles are controlled by a foot-lever, and the starting of the twister-heads is controlled by a lever; but after the loop is completed the twister-heads are automatically thrown out of operation by suitable clutch mechanism.

We will now specifically describe our improved machine as illustrated in the accompanying drawings.

8 indicates the bed-plate of the machine, which is supported upon legs 9.

10 indicates the main driving-shaft of the machine, which extends longitudinally of the bed-plate 8, being mounted in suitable bearings, and carries near its opposite ends fixed gears 11 and 12. The gear 12 is of slightly less diameter than the gear 11, for reasons stated later. The shaft 10 also carries a pulley 13, which is loosely mounted upon it and is driven from a suitable source of power.

To connect the pulley 13 with the shaft 10 in order to drive the gears 11 12, a clutch is provided, which is best illustrated in Figs. 3 and 6. This clutch consists of a sliding pin or block 14, which is carried in a suitable bearing 15 in the gear 11 and is adapted to move into and out of engagement with a lug 16, carried by the pulley 13. A spring 17 (shown in Fig. 3) tends to move said pin 14 into engagement with the lug 16. The pin 14 is normally held out of engagement with the lug 16 by a lever 18, mounted upon a rock-shaft 19, which rock-shaft is pivotally supported at the rear of the machine, as illustrated in Figs. 1 and 3, and has an arm 20, extending to the front of the bed-plate 8, terminating under it, as illustrated in Fig. 1. The upper end of the lever 18 is beveled or inclined, as shown at 21 in Fig. 3, and is adapted to engage the beveled head 22 of the pin 14, (see Figs. 3 and 6,) the bearing 15 being cut away at the proper point to permit such engagement. The arrangement is such than when the lever 21 is in engagement with the head 22 of the pin 14, as illustrated in Fig. 3, said pin will be held out of engagement with the lug 16 of the pulley 13. When, however, the lever 18 is moved out of engagement with the pin 14, said pin moves into engagement with the lug 16 under the action of the spring 17. The lever 18 is moved out of engagement with the pin 14 by upward pressure on the lower end of the arm 20 of the rock-shaft 19. When said arm is released, the lever 18 falls back into position to engage the pin 14 as soon as it returns opposite the lever.

In operation a single revolution of the pulley 13 and gears 11 12 is sufficient to effect the twisting of the ends of the wire, and consequently as soon as the operator has started the gears he releases the arm 20 and the gears are automatically stopped as soon as a single rotation is completed. The gear 11 meshes with a gear 23, which is about one-fourth the diameter of the gear 11. Consequently a single revolution of the gear 11 causes a quadruple revolution of the gear 23. The latter gear is mounted upon a twister-head shaft 24, which is carried in a horizontal position in suitable bearings 25 26, as shown in Fig. 3.

27 indicates a twister-head mounted on the inner end of the shaft 24.

28 indicates a slot at the inner portion of the shaft 24, said slot communicating with a passage 29, which extends through said shaft.

The gear 12 meshes with a gear 30, which in turn meshes with a gear 31, corresponding to the gear 23, the gear 31 being mounted upon a second twister-head shaft 32, arranged in line with the shaft 24 and having a slot 33, passage 34, and twister-head 35. The shaft 32 is also mounted in bearings 25 26.

The object of using an intermediate gear 30 is to cause the shafts 24 32 to rotate in opposite directions, and the sizes of the gears 12 31 are proportionately the same as those of the gears 11 23. The gears 12 31 are, however, slightly less in diameter than the gears 11 23, respectively, in order to permit of the use of the intermediate gear 30 without throwing the axis of the gear 31 out of line with the axis of the gear 23.

In Fig. 7 we have illustrated one of our improved twister-heads, and from such illustration it will be seen that such twister-heads are flattened at the top and provided with a plurality of disks 36, mounted upon studs 37, secured in the twister-heads. The disks 36 have grooved peripheries to receive the wire, as illustrated in Fig. 4. The studs 37 are removable and adjustable in their sockets, set-screws 38 being provided to hold them in position.

As shown in the drawings, the twister-heads are spaced apart sufficiently to permit of the passage of a spindle 39, which is mounted in a suitable bearing 40, carried by the bed-plate 8, so arranged that the spindle 39 moves in a vertical line and is free to rotate, as hereinbefore stated. A shoulder 41 prevents excessive downward movement of the spindle.

42 indicates a pin carried at the upper end of the spindle 39, around which the wires are looped, as will be hereinafter described.

43 and 44 indicate recesses in the upper end of the lower spindle 39, forming shoulders 45 and 46, respectively, which shoulders serve to bend the wire in starting the loop, as will be hereinafter described.

47 and 48 indicate the wires.

As shown in Fig. 2, the lower end of the spindle 39 extends a short distance below the bed-plate 8 and carries a pin 49, extending at an angle thereto.

50 indicates a bell-crank lever, which is suitably pivoted below the bed-plate 8 and has a vertical arm 51 and a horizontal arm 52. The vertical arm 51 extends under the lower end of the lower spindle 39 and normally supports said spindle.

53 indicates an inclined surface at the upper portion of the arm 51, which inclined portion leads to a slightly-curved portion 54, at one side of which is a plate 55. The arrangement is such that when the arm 51 is rocked in the direction indicated by the arrow in Fig. 1 the lower end of the lower spindle 39, resting upon the inclined portion 53 of the arm 51, will be caused to rise as said arm moves until it reaches the curved surface 54, when it will not be raised farther. At this time, however, the plate 55 will strike the pin 49, and as the arm 51 continues to move will by its pressure upon said pin cause the spindle 39 to rotate about a vertical axis to the extent of about forty-five degrees, more or less. By rocking the arm 51 in the reverse direction the spindle 39 will be restored to its former position. The object of this partial rotation of the lower spindle 39 is to properly shape the wire at the beginning of the loop, as will be hereinafter more fully described.

The bell-crank lever 50 is rocked in the operation above described by means of a foot-lever 56, suitably pivoted to a support 57 or otherwise, and normally held up by a spring 58, as shown in Fig. 1. A connecting-rod 59 serves to connect the lever 56 with the arm 52 of the bell-crank lever 50, adjusting-nuts 60 being provided upon said connecting-rod at opposite sides of the arm 52, as shown in Fig. 1.

61 indicates the upper spindle, which, as illustrated in Figs. 1 and 2, is arranged in line with the lower spindle and above it, being vertically movable in bearings 62 63, carried by a bracket 64, which rises from the bed-plate 8. The upper portion of the upper spindle 61 is fitted into a sleeve 65, which moves vertically in the bearing 62, but does not rotate. The sleeve 65 is provided with a spiral cam 66, which engages a lug or pin 67, projecting from the spindle 61, as shown in Fig. 1, so that by moving the sleeve 65 down upon the spindle 61 the spindle may be caused to rotate. A spring 68 is connected to the upper end of the sleeve 65 and to the upper end of the spindle 61, preferably by means of a nut 69, as shown in Fig. 1. The spring 68 serves to return the spindle 61 to its uppermost position after it has been depressed and also to rotate it in the direction opposite to that in which it was rotated by the downward movement of the sleeve 65. The spindle 61 carries at its lower end a cross-head 70, having arms 71 72, which are adapted to engage the free ends of the wires 47 48 in such manner that when the spindle 61 is rotated said wires will be twisted around the pin 42 to form the interlocking loops or eyes.

The sleeve 65 and spindle 61 are moved downward to engage and twist the wires by a lever 73, which is pivoted at its rear end upon a suitable support 74 and at its forward end is connected by a fork 75 to the sleeve 65, as shown in Figs. 1 and 2. The lever 73 is connected between its ends to the upper end of the connecting-rod 59 by nuts 76 77, as shown in Fig. 1, the nuts 76 77 being sufficiently far apart to permit a certain amount of play of the rod 59, as illustrated. The object of this arrangement is to provide for operating the bell-crank lever 50, thereby elevating the lower spindle 39 before the upper spindle 61 is moved down into operative position.

78 indicates an arm which acts to hold the wires down upon the pin 42 while the twister-heads are securing the ends of said wires. The arm 78 is suitably pivoted upon the machine, as illustrated in Fig. 1, and is provided with a projection 79, which bears against a cam 80, mounted upon the shaft 10, as indicated by dotted lines in Fig. 1 and illustrated in Fig. 3. The cam 80 has a recess at one point, which receives the projection 79 when the shaft 10 is not in motion, thereby permitting the arm 78 to assume its uppermost position under the influence of the spring 81, as illustrated in Fig. 1. When, however, the shaft 10 is rotated, the rotation of the cam 80 immediately forces the arm 78 down, throwing its forward end over upon the upper end of the pin 42, the spindle 61 meanwhile being out of the way, so that the wires are properly held down in position to be secured by the twister-heads.

The operation of our improved machine is as follows: Normally the various parts are in the position shown in Fig. 1, the pin 42 being substantially in line with the axes of the twister-heads. The wires 47 48 are then inserted through the shafts 24 32, their inner ends overlapping, as shown in Fig. 4, and resting upon the upper end of the spindle 39. The operator then presses down upon the foot-lever 56, moving said lever downward and rocking the bell-crank lever 50, causing the spindle 39 to move up upon the incline 53. As the spindle 39 moves upward it carries the inner ends of the wires with it to a point above the twister-heads 27 35, the wires then lying in the position shown in Fig. 2. A continuation of the downward movement of the foot-lever continues the rocking of the bell-crank lever 50, and consequently the engagement of the plate 55 with the pin 49, carried by the lower spindle 39, causes such spindle to rotate partially about a vertical axis, and as such spindle rotates the shoulders 45 46 engage the adjacent portions of the wires, bending them to an angle of about forty-five degrees, as indicated by dotted lines in Fig. 4. The wires are thus properly deflected to form the first part of the loops. Further downward movement of the lever 56 causes the nut 77 to engage the lever 73, moving it downward, and consequently effecting the downward movement of the upper spindle 61 and sleeve 65, which move downward together until the cross-head 70 engages the free ends of the partially-bent wires 47 48, the pin 42 moving into a suitable socket in the cross-head, so that the wires are properly held in position while the loops are formed. As the lever 73 continues to move downward the cam 66 of the sleeve 65, bearing upon the pin 67, which projects from the spindle 61, causes such spindle and the cross-head 70 to rotate, thus bending the wires around the pin 42 and forming interlocking loops. It will be understood that the rotation of the spindle 61 is in a direction opposite to that in which the spindle 39 was partially rotated, as above described. The position of the ends of the wires when the interlocking loops have been formed, as above described, is illustrated in Fig. 5. Immediately upon the completion of this operation the operator releases the foot-lever 56 and presses upward on the arm 20 of the rock-shaft 19. As soon as the lever 56 is released the spring 58 raises it to its normal position, thereby reversing the movement of the bell-crank lever 50, permitting the lower spindle 39 to drop to its normal position. At the same time the spring 68 returns the upper spindle 61 and sleeve 65 to their normal positions. Upward movement of the arm 20, as above stated, moves the lever 18 out of engagement with the pin 14, permitting it to engage the pulley 13, and consequently locking said pulley to the gear 11 and driving the shaft 10, upon which the gears 11 12 are mounted, thereby effecting the rotation of said gears and through them the rotation of the twister-head shafts and twister-heads. As soon as the shaft 10 commences to rotate the arm 78 is moved downward by the cam 80, so that its forward end rests upon the pin 42, holding the wires in proper position upon said pin, as hereinbefore stated. As the twister-heads rotate the disks 36 engage the free ends of the wires 47 48, twisting them tightly around the body of the wires, completing the eyes. When the shaft 10 has made a complete rotation, the clutch will be automatically disengaged from the pulley 13 and the twister-heads will stop, leaving the machine in readiness to form another pair of interlocking eyes.

It will be noted from the above description that the only operations required of the operator are the movement of the lever 56 and arm 20, the movement of such levers serving to operate all the other parts of the machine.

We have described our improved machine in detail, but wish it to be understood that our invention is not limited to the specific constructions described, but includes modifications and equivalents thereof. Furthermore, while we have described and claimed our machine with particular reference to the forming of interlocking eyes in wire we do not wish to limit ourselves to such use alone, as our invention includes such other uses as the various combinations may be adapted for.

That which we claim as our invention, and desire to secure by Letters Patent, is—

1. In a machine for forming interlocking eyes, the combination with twister devices, of a wire-supporting device between said twister devices, and means for moving said wire-supporting device to carry the wires beyond the twister devices to permit of their being looped, substantially as described.

2. In a machine for forming interlocking eyes, the combination with twister devices, of a wire-supporting device between said twister devices, means for moving said wire-supporting device to carry the wires beyond the twister devices, means for looping said wires, and means for deflecting the ends of the wires before looping, substantially as and for the purpose specified.

3. In a machine for forming interlocking eyes, the combination with twister devices, of a wire-supporting device between said twister devices, means for moving said wire-supporting device to carry the wires beyond the twister devices, means for looping the wires, means for returning the looped wires to position between the twister devices, and means for operating the twister devices to wrap the ends of the wires, substantially as described.

4. In a machine for forming interlocking eyes, the combination with twister devices, of a wire-supporting device between said twister devices, means for moving said wire-supporting device to carry the wires beyond the twister devices, means for looping the wires, means for returning the looped wires to position between the twister devices, means for operating the twister devices to wrap the ends of the wires, and means for holding the wires down in position during the operation of the twister devices, substantially as described.

5. In a machine for forming interlocking eyes, the combination with a vertically-movable spindle, of twister devices at opposite sides of the upper end thereof, means for moving said spindle upward to carry the wires above said twister devices, and means coöperating with said spindle to loop the ends of the wires together, substantially as described.

6. In a machine for forming interlocking eyes, the combination with upper and lower longitudinally-movable spindles, means for moving said spindles toward each other, means for rotating one of said spindles to loop the wires together, and a controlling device adapted to be operated to actuate said spindles, substantially as described.

7. In a machine for forming interlocking eyes, the combination with upper and lower spindles, of a lever common to both said spindles, means controlled by said lever for moving said spindles toward each other, and means for rotating one of said spindles to form interlocking loops, substantially as described.

8. In a machine for forming interlocking eyes, the combination with upper and lower longitudinally-movable spindles, of means for rotating said spindles in opposite directions to form interlocking loops, and a controlling device adapted to be operated to move said spindles toward each other, and to effect their rotation, and twister devices, substantially as described.

9. In a machine for forming interlocking eyes, the combination with upper and lower longitudinally-movable spindles, of means for automatically rotating said spindles in opposite directions to form interlocking loops when said spindles are moved longitudinally, and twister devices, substantially as described.

10. In a machine for forming interlocking eyes, the combination with upper and lower longitudinally-movable spindles, of means for moving said spindles toward each other, means operated by the longitudinal movement of said upper spindle for rotating it to form interlocking loops, and twister devices, substantially as described.

11. In a machine for forming interlocking eyes, the combination with twister-heads, of a lengthwise-movable spindle arranged between said twister-heads, said spindle having a pin at one end, said pin being normally in line with the axes of said twister-heads, means for moving said spindle longitudinally, means for partially rotating said spindle after it has been moved longitudinally, and means for bending the wire around said spindle to form interlocking loops, substantially as described.

12. In a machine for forming interlocking eyes, the combination with twister-heads, of a spindle 39, an arm 51 adapted to support said spindle, a plate 55 carried by said arm, said plate being adapted to engage a pin carried by said spindle, said arm having an inclined surface 53, means coöperating with said spindle to form interlocking loops in the wires, and means for moving said arm 51 to operate said spindle, substantially as described.

13. In a machine for forming interlocking eyes, the combination with twister-heads, of a spindle 39, an arm 51 adapted to support said spindle, a plate 55 carried by said arm, said plate being adapted to engage a pin carried by said spindle, said arm having an inclined surface 53, means coöperating with said spindle to form interlocking loops in the wires, and a lever 56 connected to said arm 51 for rocking the same, substantially as described.

14. In a machine for forming interlocking eyes, the combination with twister-heads, of a spindle 39, an arm 51 adapted to support said spindle, a plate 55 carried by said arm, said plate being adapted to engage a pin carried by said spindle, said arm having an inclined surface 53, means coöperating with said spindle to form interlocking loops in the wires, a lever 56 connected to said arm 51 for rocking the same, and means for operating said looping devices by the movement of said lever, substantially as described.

15. In a machine for forming interlocking eyes, the combination with twister-heads, and means for rotating the same, of spindles 39 61, a bell-crank lever 50 adapted to operate said spindle 39, a lever 56, means connecting said lever 56 with the lever 50, a lever 73 connected to said spindle 61, means for operating said lever 73 from said lever 56, and means for rotating the spindle 61, substantially as described.

16. In a machine for forming interlocking eyes, the combination with twister-heads, and means for rotating them, of spindles 39 61, a bell-crank lever 50, having an arm 51, a foot-lever 56, connecting-rod 59 connected to said bell-crank lever 50, lever 73 also connected to said connecting-rod 59, a sleeve 65 connected to said lever 73, said sleeve having a cam 66, a pin 67 carried by said spindle 61, and a spring 68 on the spindle 61, substantially as described.

17. In a machine for forming interlocking eyes, the combination with twister devices, of a wire-supporting device between said twister devices, means for moving said wire-supporting device to carry the wires beyond the twister devices, means for looping the wires, means for returning the wire-supporting device to its former position to return the looped wires to position between the twister devices, means for operating the twister devices to wrap the ends of the wires, a pivoted arm 78 adapted to rest upon the wire-supporting device, and a cam operated by the twister-head-driving mechanism for moving said arm 78, substantially as described.

18. In a machine for forming interlocking eyes, the combination with means for forming interlocking loops in the wires, of twister-heads arranged at opposite sides of the looping mechanism, a driving-shaft 10, gears fixedly mounted upon said driving-shaft, twister-head shafts, means for rotating said twister-head shafts oppositely to each other from said gears, a pulley loosely mounted upon said shaft 10, and clutch mechanism for connecting said pulley to said shaft 10, substantially as described.

19. In a machine for forming interlocking eyes, the combination with means for forming interlocking loops in the wires, of twister-heads arranged at opposite sides of the looping mechanism, a driving-shaft 10, gears fixedly mounted upon said driving-shaft, twister-head shafts, means for rotating said twister-head shafts oppositely to each other from said gears, a pulley loosely mounted upon said shaft 10, clutch mechanism for connecting said pulley to said shaft 10, and means for automatically disconnecting said pulley and shaft at the conclusion of each operation of the twister-heads, substantially as described.

20. In a machine for forming interlocking eyes, the combination with upper and lower longitudinally-movable spindles, of a controlling device adapted to be operated to move said spindles toward each other, and to effect their rotation, substantially as described.

FREDERICK W. HOEFER.
AUGUST G. HOEFER.

Witnesses:
W. A. MERRIFIELD,
L. W. KILKER.